(12) United States Patent
Wu

(10) Patent No.: US 11,080,664 B2
(45) Date of Patent: Aug. 3, 2021

(54) BLOCKCHAIN SERVICE DATA PROCESSING

(71) Applicant: Advanced New Technologies Co., Ltd., Grand Cayman (KY)

(72) Inventor: Hao Wu, Chengdu (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 118 days.

(21) Appl. No.: 16/034,252

(22) Filed: Jul. 12, 2018

(65) Prior Publication Data

US 2019/0019168 A1   Jan. 17, 2019

(30) Foreign Application Priority Data

Jul. 14, 2017   (CN) .......................... 2017 1 0575017

(51) Int. Cl.
*G06Q 20/06* (2012.01)
*G06F 21/64* (2013.01)
(Continued)

(52) U.S. Cl.
CPC ....... *G06Q 20/065* (2013.01); *G06F 21/6254* (2013.01); *G06F 21/64* (2013.01);
(Continued)

(58) Field of Classification Search
CPC ................ G06Q 20/065; G06Q 20/383; G06F 21/6254; G06F 21/64
(Continued)

(56) References Cited

U.S. PATENT DOCUMENTS 9,298,806 B1   3/2016  Vessenes et al.
10,055,446 B2  8/2018  Pattanaik et al.
(Continued)

FOREIGN PATENT DOCUMENTS

CN   103186249   7/2013
CN   105608146   5/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Robert R Niquette
(74) *Attorney, Agent, or Firm* — Fish & Richardson P.C.

(57) ABSTRACT

Implementations of the present disclosure provide techniques to improve the security in blockchains by anonymizing the information of the service data. In some implementations, first service data is received from a plurality of blockchain nodes in a blockchain network. The first service data received from each blockchain node is associated with a first source address and a first destination address. Second service data is formed. The second source data includes a second source address that is formed based on a plurality of first source addresses and a plurality of first destination addresses associated with the first service data. The second service data is sent to a blockchain node of the plurality of blockchain nodes. The second service data is processed in response to receiving a verification message from the blockchain node verifying that the second service data includes a part of the first service data provided by the blockchain node.

20 Claims, 9 Drawing Sheets

(51) Int. Cl.
  *G06Q 20/38* (2012.01)
  *G06F 21/62* (2013.01)
  *H04L 29/06* (2006.01)
  *H04W 12/00* (2021.01)
(52) U.S. Cl.
  CPC ....... *G06Q 20/383* (2013.01); *H04L 63/0407* (2013.01); *H04L 63/0421* (2013.01); *H04W 12/0013* (2019.01); *G06Q 2220/00* (2013.01)
(58) Field of Classification Search
  USPC .......................................................... 705/39
  See application file for complete search history.

(56) References Cited

U.S. PATENT DOCUMENTS

| | | | |
|---|---|---|---|
| 2016/0342994 A1 | 11/2016 | Davis | |
| 2017/0005804 A1 | 1/2017 | Zinder | |
| 2017/0076109 A1 | 3/2017 | Kaditz | |
| 2017/0109735 A1 | 4/2017 | Sheng et al. | |
| 2017/0132625 A1 | 5/2017 | Kennedy | |
| 2017/0228731 A1 | 8/2017 | Sheng et al. | |
| 2018/0129952 A1 | 5/2018 | Saxena et al. | |
| 2018/0181953 A1 | 6/2018 | Lacoss-Arnold et al. | |
| 2018/0349896 A1 | 12/2018 | Arora et al. | |
| 2019/0122208 A1 | 4/2019 | Richardson | |
| 2019/0130391 A1 | 5/2019 | Wright et al. | |
| 2019/0215151 A1* | 7/2019 | Wang | G06Q 20/065 |
| 2020/0005255 A1* | 1/2020 | Wu | G06Q 20/3674 |
| 2020/0028692 A1* | 1/2020 | Wu | H04L 9/0637 |
| 2020/0126048 A1 | 4/2020 | Wu | |

FOREIGN PATENT DOCUMENTS

| | | |
|---|---|---|
| CN | 106788985 | 5/2017 |
| KR | 101628007 | 6/2016 |
| TW | 201627889 | 8/2016 |
| TW | M542178 | 5/2017 |
| TW | I588763 | 6/2017 |

OTHER PUBLICATIONS

Nakamoto, "Bitcoin: A Peer-to-Peer Electronic Cash System," www.bitcoin.org, 2005, 9 pages.

Gmaxwell [online], "CoinJoin: Bitcoin privacy for the real world," Aug. 2013, retrieved on Jul. 16, 2019, retrieved on URL<https://bitcointalk.org/index.php?topic=279249.0>, 4 pages.

PCT International Preliminary Report on Patentability in International Application No. PCT/US2018/042038, dated Sep. 19, 2019, 9 pages.

International Search Report and Written Opinion of the International Searching Authority issued in International Application No. PCT/US2018/042038 dated Sep. 18, 2018; 14 pages.

Anonymous: "Coinjoin: Bitcoin Privacy for the Real World"; Aug. 22, 2013; retrieved from the Internet: URL:https://bitcointalk.org/idex.php?topic279249.

Anonymous: "[ANN] Joinmarket—Coinjoin That People Will Actually Use"; Jan. 9, 2015; Retrieved from the Internet: URLhttps://bitcointalk.org/index.php?topic=919116.msg10096563.

Japanese Patent Application No. 2019-538237 Office Action, 9 pages, dated Nov. 25, 2020 (English Translation, including summary of Narayanan et al.).

Narayanan et al., "BitCoin and Cryptocurrency Technologies A Comprehensive Introduction", Nikkei BP, Dec. 9, 2016, 1st edition, pp. 245-288. 2016 (in Japanese) N.

* cited by examiner

BLOCKCHAIN SERVICE DATA PROCESSING

CROSS-REFERENCE TO RELATED APPLICATIONS

This application claims priority to Chinese Patent Application No. 201710575017.3, filed on Jul. 14, 2017, which is hereby incorporated by reference in its entirety.

TECHNICAL FIELD

The present application relates to the field of Internet information processing technologies and the field of computer technologies, and in particular, to a service data processing method and device, and a service processing method and device.

BACKGROUND

The blockchain technology is also referred to as a distributed ledger technology. As a distributed Internet database technology, the blockchain technology is characterized by decentralization, transparency, unchangeability, and trustiness. A network constructed based on the blockchain technology can be referred to as a blockchain network. The blockchain network includes a network node (which can also be referred to as a blockchain node, and is referred to as "node" for simplicity). Each node corresponds to at least one blockchain, and each blockchain includes at least one block. Each block includes at least one piece of service data.

The service data usually includes but is not limited to a source address, a destination address, a size of a service object (for example, digital assets or digital currencies), etc. The service data corresponds to a service of transferring the service object from a source address to a destination address. For example, if the service data is transferring 10 RMB (a service object) from a source address to a destination address, a corresponding service is expending 10 RMB from the source address and adding 10 RMB to the destination address.

In actual application, the source address and the destination address included in the service data can be represented by a string of numbers (or a character string), and identity information of two service parties is not explicit, so that the two service parties are anonymously protected. However, due to transparency of the blockchain network, a service data association can be identified by analyzing service data stored in the blockchain network, and authentic information that corresponds to the numbers is easily inferred from the association. For example, it is learned by analyzing some service data that the service data has the same destination address and authentic information that corresponds to the numbers can be easily inferred (for example, the numbers correspond to a bank) based on a size of a service object included in the service data and characteristics of the industry.

SUMMARY

In view of this, implementations of the present application provide a service data processing method and device, and a service processing method and device, to improve information security.

The following technical solutions are used in the implementations of the present application:

An implementation of the present application provides a service data processing method, and the service data processing method includes: receiving first service data sent by at least one first blockchain node, where the first service data includes a first source address and a first destination address; creating second service data based on the first service data, where the second service data includes a second source address and a second destination address, the second source address includes the first source address, and the second destination address includes the first destination address; sending the second service data to the first blockchain node, so that the first blockchain node checks the second service data; and processing the second service data when acknowledgement information sent by the first blockchain node is received.

An implementation of the present application further provides a service data processing method, and the service data processing method includes: sending, by a first blockchain node, first service data to a second blockchain node, where the first service data includes a first source address and a first destination address; receiving second service data created by the second blockchain node, where the second service data includes a second source address and a second destination address, the second source address includes the first source address, and the second destination address includes the first destination address; checking the second service data; and sending acknowledgement information to the second blockchain node, so that the second blockchain node processes the second service data.

An implementation of the present application further provides a service processing method, and the service processing method includes: receiving service processing requests sent by blockchain nodes, where the service processing requests are used to notify a server of a service data processing requirement, and the service processing requests include node identifiers; selecting a set number of node identifiers from the node identifiers; and sending feedback information that includes the selected node identifiers to blockchain nodes that correspond to the selected node identifiers, so that one of the blockchain nodes creates second service data based on first service data sent by the blockchain nodes, and processes the second service data.

An implementation of the present application further provides a service data processing device, and the service data processing device includes: a receiving module, configured to receive first service data sent by at least one first blockchain node, where the first service data includes a first source address and a first destination address; a creation module, configured to create second service data based on the first service data, where the second service data includes a second source address and a second destination address, the second source address includes the first source address, and the second destination address includes the first destination address; a sending module, configured to send the second service data to the first blockchain node, so that the first blockchain node checks the second service data; and a processing module, configured to process the second service data when acknowledgement information sent by the first blockchain node is received.

An implementation of the present application further provides a service data processing device, and the service data processing device includes: a sending module, configured to send first service data to a second blockchain node, where the first service data includes a first source address and a first destination address; a receiving module, configured to receive second service data created by the second blockchain node, where the second service data includes a second source address and a second destination address, the second source address includes the first source address, and the second destination address includes the first destination address; and a checking module, configured to check the second service data, where the sending module sends acknowledgement information to the second blockchain node, so that the second blockchain node processes the second service data.

An implementation of the present application further provides a service processing device, and the service processing device includes: a receiving module, configured to receive service processing requests sent by blockchain nodes, where the service processing requests are used to notify a server of a service data processing requirement, and the service processing requests include node identifiers; a selection module, configured to select a set number of node identifiers from the node identifiers; and a sending module, configured to send feedback information that includes the selected node identifiers to blockchain nodes that correspond to the selected node identifiers, so that one of the blockchain nodes creates second service data based on first service data sent by the blockchain nodes, and processes the second service data.

An implementation of the present application further provides a service data processing device. The service data processing device includes at least one processor and a memory. The memory stores a program, and the program is used by the at least one processor to perform the following steps: receiving first service data sent by at least one first blockchain node, where the first service data includes a first source address and a first destination address; creating second service data based on the first service data, where the second service data includes a second source address and a second destination address, the second source address includes the first source address, and the second destination address includes the first destination address; sending the second service data to the first blockchain node, so that the first blockchain node checks the second service data; and processing the second service data when acknowledgement information sent by the first blockchain node is received.

An implementation of the present application further provides a service data processing device. The service data processing device includes at least one processor and a memory. The memory stores a program, and the program is used by the at least one processor to perform the following steps: sending first service data to a second blockchain node, where the first service data includes a first source address and a first destination address; receiving second service data created by the second blockchain node, where the second service data includes a second source address and a second destination address, the second source address includes the first source address, and the second destination address includes the first destination address; checking the second service data; and sending acknowledgement information to the second blockchain node, so that the second blockchain node processes the second service data.

An implementation of the present application further provides a service processing device. The service processing device includes at least one processor and a memory. The memory stores a program, and the program is used by the at least one processor to perform the following steps: receiving service processing requests sent by blockchain nodes, where the service processing requests are used to notify a server of a requirement for creating second service data by using first service data, and the service processing requests include node identifiers of the blockchain nodes; selecting a set number of blockchain nodes from the blockchain nodes as first blockchain nodes based on the service processing requests; and separately sending node identifiers of the selected first blockchain nodes to the first blockchain nodes, so that a second blockchain node among the first blockchain nodes receives the first service data sent by the first blockchain nodes, creates the second service data based on the first service data, and processes the second service data.

The at least one technical solution used in the implementations of the present application can achieve the following beneficial effects:

The first service data sent by the at least one first blockchain node is received, and then the second service data is created by using the received first service data. In the second service data, the second source address includes the first source address, and the second destination address includes the first destination address. As such, in the second service data, a one-to-one mapping relationship between the first source address and the first destination address is confusing. One first source address can correspond to a plurality of first destination addresses, and one first destination address can correspond to a plurality of first source addresses, which weakens an association between a source address and a destination address in service data. In addition, because different first blockchain nodes participate in creation of second service data, when analyzing the second service data, it is difficult to infer authentic information that corresponds to digital addresses, such as source addresses and destination addresses, so that the authentic information cannot leak.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings.

DESCRIPTION OF IMPLEMENTATIONS

Figure 1:
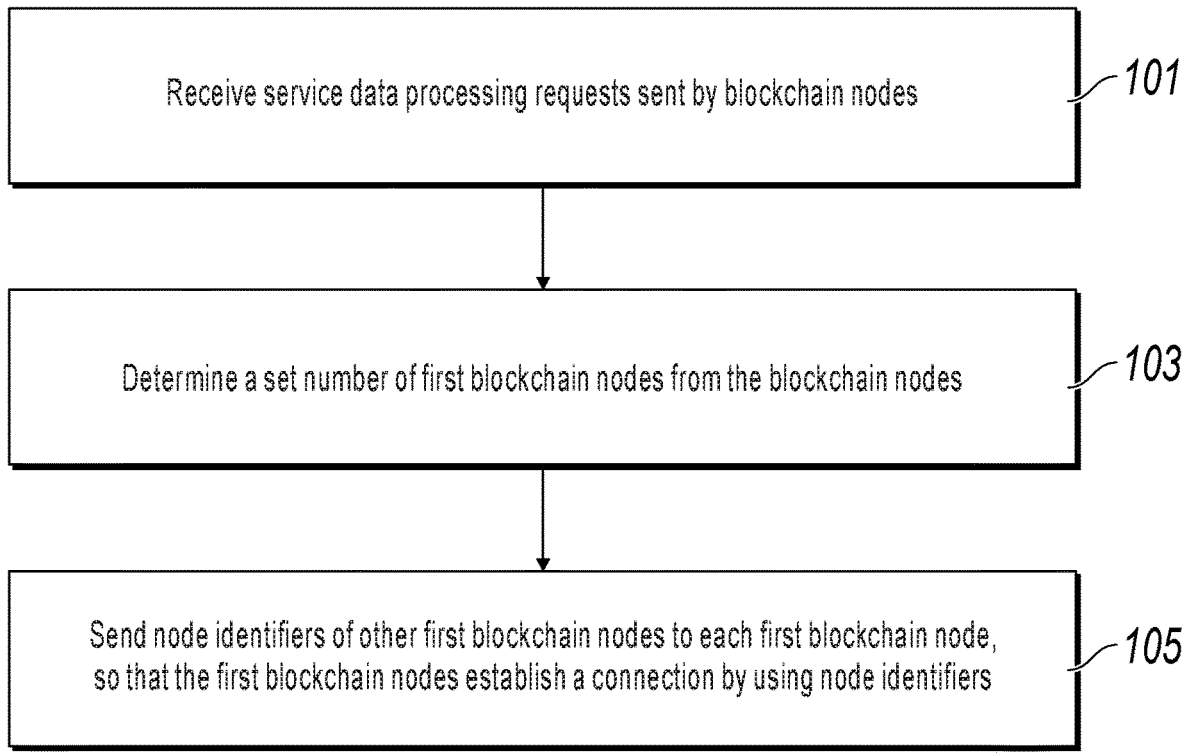
FIG. 1 is a flowchart illustrating a service processing method, according to an implementation of the present application.

Eliminating a service data association is one way to resolve the problem in the existing technology, so that service data cannot be analyzed in depth, therefore, user's authentic information is less likely to leak. For example, when creating service data, a node can provide at least two source addresses and/or destination addresses, and split a service object into a plurality of service sub-objects. These service sub-objects can be transferred between the at least two source addresses and/or destination addresses. Correspondingly, the service data can include the plurality of service sub-objects and the at least two source addresses and/or destination addresses.

However, the node can provide a limited number of source addresses or destination addresses, and it increases the node's burden to process service data. In view of this, a second blockchain node can receive first service data sent by at least one first blockchain node. The first service data includes a first source address and a first destination address. Then, the second blockchain node creates second service data by using the first service data. The second service data includes a second source address and a second destination address, the second source address includes the first source address, and the second destination address includes the first destination address. Afterwards, the second blockchain node sends the second service data to the first blockchain node, so that the first blockchain node checks the second service data. The second blockchain node processes the second service data when receiving acknowledgement information. As such, the second service data can include first service data from a plurality of first blockchain nodes, and a service data processing node in a blockchain network does not need to provide a source address or a destination address in addition. Therefore, the first blockchain node can process service data with less burden.

It is worthwhile to note that "first" and "second" in "first blockchain node" and "second blockchain node", "first service data" and "second service data", "first source address" and "second source address", and "first destination address" and "second destination address" do not have special meanings, and are merely used for distinguishing.

To make the objectives, technical solutions, and advantages of the present application clearer, the following clearly describes the technical solutions of the present application with reference to specific implementations of the present application and corresponding accompanying drawings. Apparently, the described implementations are merely some rather than all of the implementations of the present application. All other implementations obtained by a person of ordinary skill in the art based on the implementations of the present application without creative efforts shall fall within the protection scope of the present application.

The following describes in detail the technical solutions provided in the implementations of the present application with reference to the accompanying drawings.

FIG. 1 is a flowchart illustrating a service processing method, according to an implementation of the present application. The service processing method is shown below. The service processing method can be performed by a server, can be performed by a blockchain node in a blockchain network, or can be performed by a node outside the blockchain network.

Step 101: Receive service processing requests sent by blockchain nodes, where the service processing requests are used to notify a server of a service data processing requirement, and the service processing requests include node identifiers.

The node identifiers are used to identify corresponding blockchain nodes.

In this implementation of the present application, when any blockchain node has a service data processing requirement, the blockchain node can send a service processing request to the server, to notify the server of the service data processing requirement.

In this implementation of the present application, the service processing request may not include specific service data, so that service data is less likely to leak during transmission. Alternatively, the service processing request can include specific service data. In this case, the service data can be encrypted before being transmitted, so as to improve service data transmission security.

Step 103: Select a set number of node identifiers from the node identifiers.

In actual application, the server can receive service processing requests sent by a plurality of blockchain nodes, and then select a set number of node identifiers from the node identifiers included in the service processing requests, to form a node identifier set (which can be referred to as a first blockchain node identifier set).

In this implementation of the present application, the server can select the set number of node identifiers from other node identifiers in the following methods:

Method 1: The server selects, based on a predetermined node identifier selection rule, the set number of node identifiers from the node identifiers received in a specified time interval.

The predetermined node identifier selection rule can specify the number of selected node identifiers, or can specify features of blockchain nodes that correspond to different selected node identifiers. This is not limited here.

In this implementation of the present application, to ensure service data processing efficiency, the server can select the node identifiers based on the specified time interval. The specified time interval can be determined based on a current system time of the server, or can be determined based on a time of generating service data. This is not limited here.

Method 2: If the received service processing requests include quantity information, the server can select node identifiers that satisfy the quantity information from the node identifiers based on the quantity information.

The set number can be determined based on the quantity information included in the service processing requests, or can be determined as required. This is not limited here.

If all the received service processing requests include quantity information, the server can select the node identifiers in Method 1.

If one of the received service processing requests includes quantity information, the server can select node identifiers that satisfy the quantity information from the node identifiers based on the quantity information included in the service processing request. Alternatively, the server can select node identifiers based on a predetermined number determining priority. If the number determining priority specifies that a priority of a set number configured by the server is higher than a priority of quantity information determined by a blockchain, the server can select the node identifiers in Method 1. If the number determining priority specifies that the priority of the set number configured by the server is lower than the priority of the quantity information determined by the blockchain, the server can select the node identifiers in Method 2.

If at least two of the received service processing requests include quantity information, one piece of reference quantity information needs to be selected from the plurality of quantity information, so that the server selects node identifiers that satisfy the reference quantity information from the node identifiers.

In this implementation of the present application, the reference quantity information can be an intersection set of the plurality of quantity information, or can be an average value of the plurality of quantity information. This is not limited here.

It is worthwhile to note that, when selecting a node identifier, the server preferentially selects a node identifier that is included in a service processing request and that satisfies the reference quantity information.

However, when selecting the quantity information, the server further needs to consider the number of received node identifiers. If a selected number interval is less than the number of received node identifiers, when the server selects node identifiers, some service data may not be processed in time, and subsequent second service data is less confusing. If the selected quantity information is greater than the number of received node identifiers, when selecting node identifiers, the server may need to wait for a time period, so that the number of received service processing requests reaches the selected quantity information. The subsequent second service data is more confusing but this may prolong a service data processing time. Therefore, when selecting the quantity information, the server needs to select proper quantity information, to achieve balance between a service data processing progress and a second service data confusion degree.

Method 3: The server can send a plurality of number intervals to the blockchain nodes in advance. Each blockchain node selects one number interval from the received number intervals, and sends the selected number interval to the server. The server selects, based on the number interval sent by each blockchain node, a set number of node identifiers from node identifiers of blockchain nodes that send the same number interval, to obtain a node identifier set.

For example, if the server can provide a plurality of number intervals such as "greater than 5", "greater than 10", "greater than 50", and "greater than 100", each blockchain node can select one number interval from the number intervals. "Greater than 10" is used as an example. The server can select a set number of node identifiers from node identifiers of blockchain nodes that select "greater than 10", and the set number can range from 11 to 50. To be specific, the server can select 11 node identifiers from the node identifiers of the blockchain nodes that select "greater than 10", or select 50 node identifiers from the node identifiers of the blockchain nodes that select "greater than 10".

When selecting a number interval, each blockchain node not only needs to consider a service data processing progress, but also needs to consider a second service data confusion degree. If a lower limit of a selected number interval is relatively small, the server can gather node identifiers that satisfy the lower limit within a relatively short time period, and send feedback information to the blockchain nodes, so that the second service data can be created as soon as possible. However, the confusion degree is relatively low because the second service data includes less first service data. On the contrary, if a lower limit of a selected number interval is relatively large, it may take the server a relatively long time to gather node identifiers that satisfy the lower limit, before the server sends feedback information to the blockchain nodes. Therefore, creation of the second service data is obviously delayed. However, the confusion degree is relatively high because the second service data includes more first service data. Therefore, each blockchain node can select a proper number interval, to achieve balance between the service data processing progress and the second service data confusion degree.

The server can select node identifiers based on quantity. The selection can be random selection or other selection method. Here, a selection method is determined providing that there is a lack of service association among blockchain nodes that correspond to node identifiers in a node identifier set and among service data that corresponds to the blockchain nodes. Therefore, a confusion degree is relatively high. A specific method is not limited.

Step 105: Send feedback information that includes the selected node identifiers to blockchain nodes that correspond to the selected node identifiers, so that one of the blockchain nodes creates second service data based on first service data sent by the blockchain nodes, and processes the second service data.

The node identifier in this implementation of the present application is used to represent a blockchain node identity. The node identifier can include a network communication address, such as an E-mail address or an IP address. In addition, the node identifier can be a service account, a social account, etc. When receiving the feedback information sent by the server, the blockchain nodes can identify corresponding blockchain nodes based on the node identifiers. For example, the blockchain nodes that correspond to the selected node identifiers can establish a data connection and communicate by using the node identifiers.

In this implementation of the present application, the feedback information that includes the selected node identifiers can mean the server instructs to mix service data sent by the blockchain nodes that correspond to the node identifiers included in the feedback information. As such, identities of two service parties are less associated with each other, and information security is improved.

In this implementation of the present application, the server not only selects the set number of node identifiers (the blockchain nodes that correspond to the node identifiers can serve as objects participating in service data mixture, and can be referred to as first blockchain nodes in this implementation of the present application), but also can determine a blockchain node (which can be referred to as a second blockchain node in this implementation of the present application) that creates new service data based on service data sent by the objects participating in service data mixture. The second blockchain node is configured to receive the first service data sent by the blockchain nodes that correspond to the selected node identifiers, then create the second service data based on the first service data, and process the second service data.

A node identifier that corresponds to the second blockchain node can be included in the set number of selected node identifiers (in other words, the second blockchain node is a blockchain node included in the first blockchain nodes), or may not be included in the set number of selected node identifiers (in other words, the second blockchain node is independent of the first blockchain nodes). This is not limited here.

If the server determines the second blockchain node, the sending feedback information that includes the selected node identifiers to blockchain nodes that correspond to the selected node identifiers includes: sending, to the blockchain nodes, the feedback information that includes the selected node identifiers and includes a node identifier for instructing to create the second service data.

In this case, the blockchain nodes can determine the second blockchain node based on the feedback information. The node identifier for instructing to create the second service data can be a label or a voice. The label can be a text label, a graphic label, etc.

In addition, if the server determines the second blockchain node, the server can further send indication information to the second blockchain node. The indication information is used to notify the second blockchain node that the second blockchain node is a node creating the second service data. The feedback information sent by the server to the first blockchain nodes includes only the selected node identifiers, and the second blockchain node uses other methods (for example, through broadcasting) to notify the first blockchain nodes that the second blockchain node is the node that creates the second service data.

It is worthwhile to note that the second blockchain node can be determined by the server, or can be determined by the first blockchain nodes. This is not limited here.

Figure 2:
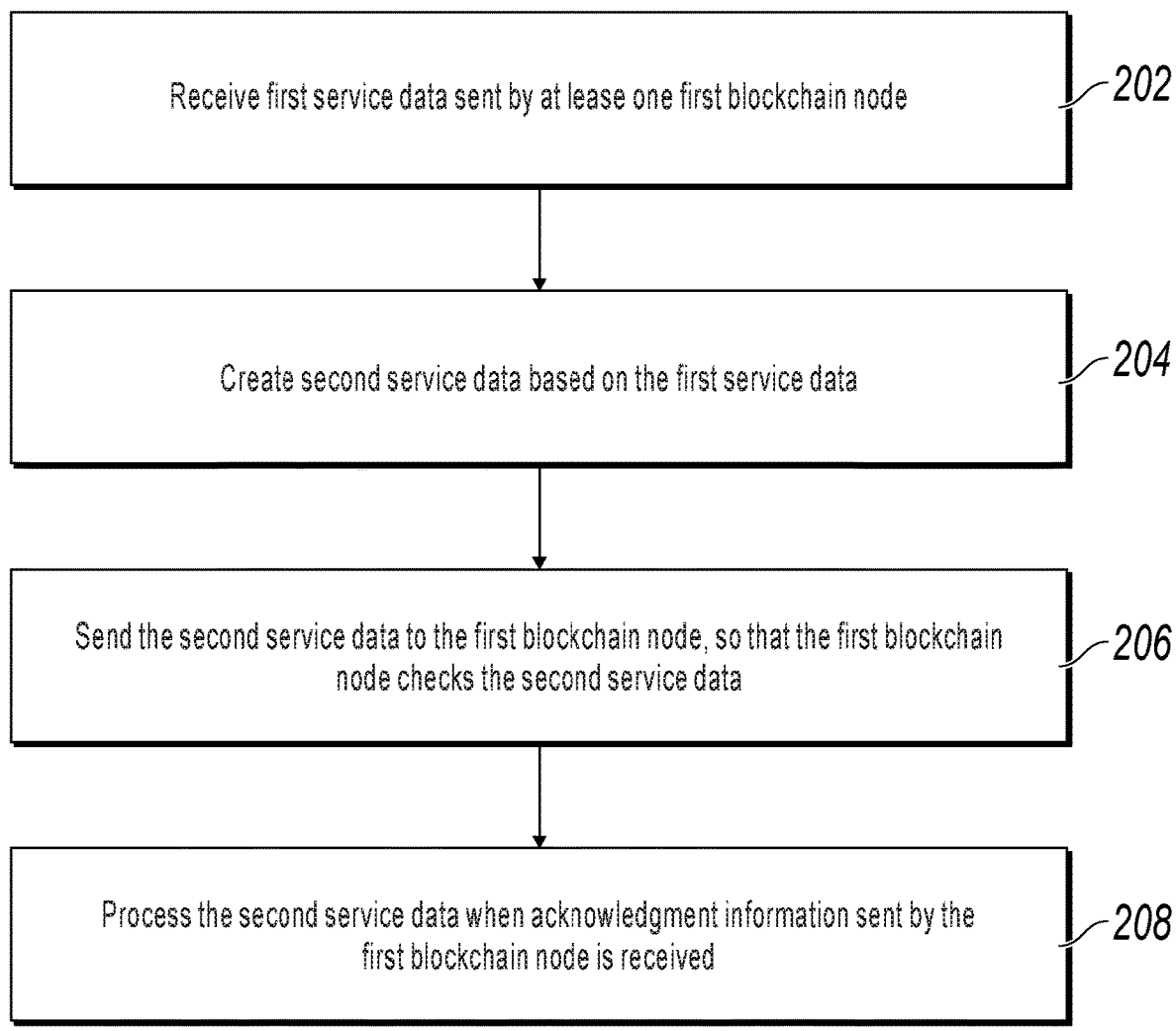
FIG. 2 is a flowchart illustrating a service data processing method, according to an implementation of the present application.

FIG. 2 is a flowchart illustrating a service data processing method, according to an implementation of the present application. The service data processing method is shown below. The service data processing method is performed by a blockchain node. The blockchain node can be referred to as a second blockchain node named to be distinguished from a first blockchain node. The second blockchain node is a node that creates second service data.

The second blockchain node can be a blockchain node selected from blockchain nodes that correspond to a determined first blockchain node set, or can be a blockchain node that is independent from the blockchain nodes that correspond to the first blockchain node set.

The second blockchain node can be determined by a server (references can be made to step 105), or can be determined by the blockchain nodes that correspond to the first blockchain node set.

The second blockchain node in this implementation of the present application may change in different service data processing procedures, and can be determined through random selection, so as to effectively prevent authentic information leakage from the second blockchain node.

Step 202: Receive first service data sent by at least one first blockchain node, where the first service data includes a first source address and a first destination address.

In this implementation of the present application, the second blockchain node can be a blockchain node that does not have a service data processing requirement, or can be a blockchain node that has a service data processing requirement.

If the second blockchain node is a blockchain node that has a service data processing requirement, in this implementation of the present application, before the receiving first service data sent by at least one first blockchain node, the method further includes: sending a service processing request to the server, where the service processing request is used to notify the server of the service data processing requirement.

In this implementation of the present application, the first blockchain node can be determined by the server, or can be determined by the second blockchain node. This is not limited here.

Based on the method shown in FIG. 1, after the second blockchain node sends the service processing request to the server, the second blockchain node can further receive feedback information returned by the server. The feedback information includes node identifiers of the blockchain nodes (including the second blockchain node) that send service processing requests to the server.

The feedback information can be obtained by using the method shown in step 101 to step 105 in the above implementation. Alternatively, the server can directly add the node identifiers of the blockchain nodes that send the service processing requests to the feedback information, and send the feedback information to the second blockchain node. This is not limited here.

The second blockchain node can determine the first blockchain node based on a node identifier included in the feedback information.

Specifically, in Method 1, the second blockchain node determines a blockchain node that corresponds to the node identifier included in the feedback information as the first blockchain node.

In Method 2, the second blockchain node selects a set number of node identifiers from the node identifiers included in the feedback information, and determines blockchain nodes that correspond to the selected node identifiers as the first blockchain nodes.

In other words, after receiving the feedback information, the second blockchain node can further select the node identifiers, so as to determine the blockchain nodes that correspond to the set number of node identifiers as the first blockchain nodes.

As such, the second blockchain node can not only determine a first blockchain node set that includes a set number of first blockchain nodes, but also identify the corresponding first blockchain nodes based on the node identifiers included in the feedback information, and communicate with the first blockchain nodes based on the node identifiers, so as to receive the first service data sent by the at least one first blockchain node.

Optionally, that the second blockchain node sends a service processing request to the server includes: adding quantity information to the service processing request, and sending the service processing request to the server, so that the server selects blockchain nodes that satisfy the quantity information from blockchain nodes that send service processing requests. This can achieve balance between a service data processing progress and a second service data confusion degree for the second blockchain node (references can be made to step 103).

To ensure information equivalence between the first blockchain nodes, when receiving the first service data sent by the at least one first blockchain node, the second blockchain node further sends third service data to the first blockchain node. The third service data is the service data that needs to be processed by the second blockchain node.

To improve data transmission security, the sending third service data to the first blockchain node can include: sending the encrypted third service data to the first blockchain node. Further, the second blockchain node can transmit the third service data through anonymous connection. The anonymous connection means that some measures are taken to conceal a communication relationship between two parties. For example, a connection is made by using an anonymous address, or a plurality of network nodes that are arranged on a transmission path to conceal the transmission path.

When sending the first service data to the second blockchain node, the first blockchain node can also encrypt the first service data, to ensure transmission security of the first service data.

The server can determine the first blockchain node set. In another implementation, blockchain nodes in a blockchain network can determine the first blockchain node set through mutual query.

Step 204: Create second service data based on the first service data, where the second service data includes a second source address and a second destination address, the second source address includes the first source address, and the second destination address includes the first destination address.

Figure 3:
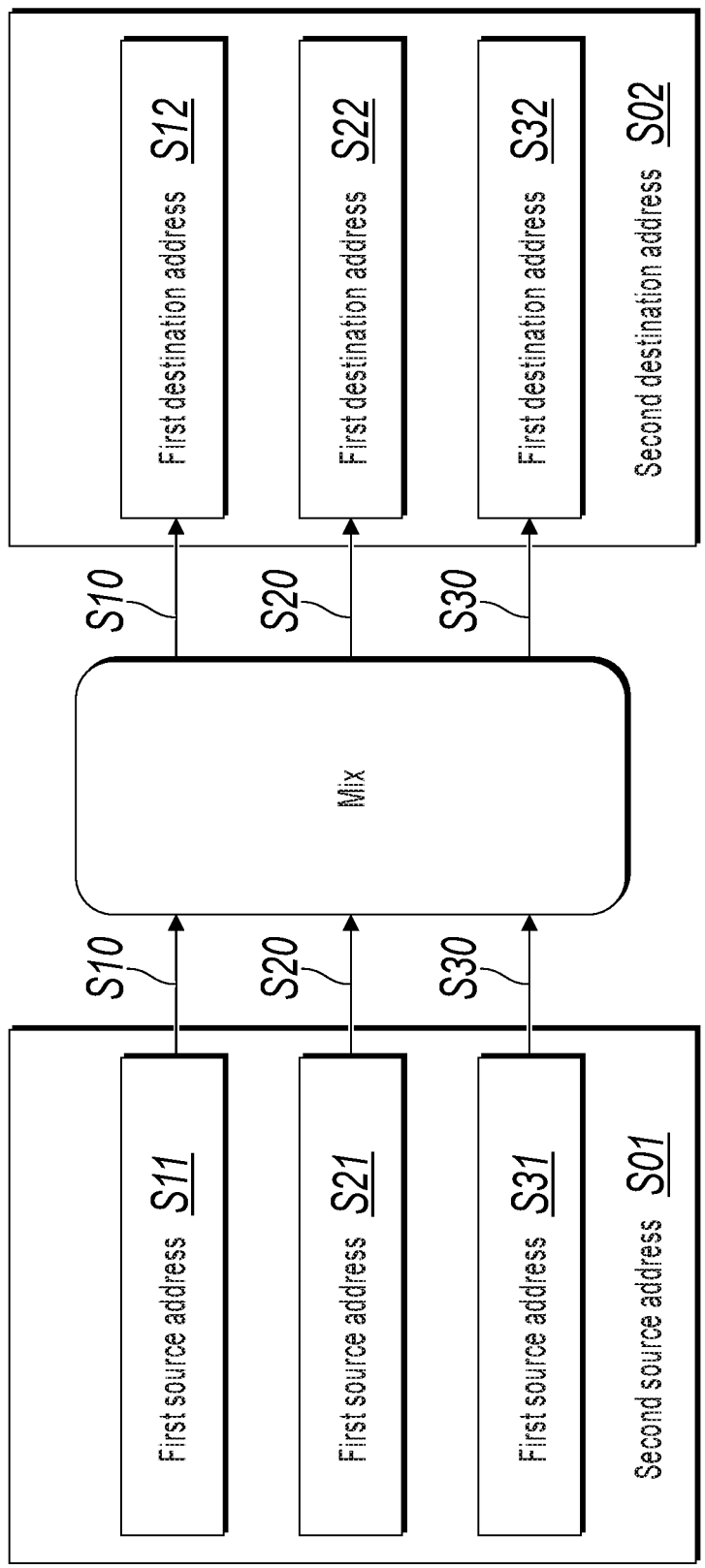
FIG. 3 is a structural diagram illustrating second service data, according to an implementation of the present application.

With reference to FIG. 3, FIG. 3 is a structural diagram illustrating second service data, according to an implementation of the present application.

Assume that the second service data includes three pieces of first service data, the first piece of first service data includes a first source address S11, a first destination address S12, and a first service object S10; the second piece of first service data includes a first source address S21, a first destination address S22, and a first service object S20; and the third piece of first service data includes a first source address S31, a first destination address S32, and a first service object S30. In this case, when the second service data is created by using the three pieces of first service data, the second service data includes a second source address S01 and a second destination address S02. The second source address S01 includes the three independent first source addresses S11, S21, and S31, and the second destination address S02 can include the three independent first destination addresses S12, S22, and S32. The first service objects S10, S20, and S30 are respectively expended from the first source addresses S11, S21, and S31, and the first destination addresses S12, S22, and S32 respectively receive the first service objects S10, S20, and S30.

It can be seen that in the second service data, the second source address S01 is a mix of the plurality of first source addresses S11, S21, and S31; and the second destination address S02 is a mix of the plurality of first destination addresses S12, S22, and S32. The first destination addresses included in the pieces of first service data are mixed, as shown in FIG. 3. Only a size of an object expended from the first source address and a size of an object received at the first destination address can be learned from the second service data, but a one-to-one mapping relationship between the first source address and the first destination address cannot be learned. Therefore, a plurality of first service data in the second service data is confused with each other, so that it is less likely to analyze the second service data.

A plurality of first service data stored in a blockchain network by the same first blockchain node can be mixed into a plurality of different second service data, but first service data included in the second service data may greatly vary because corresponding first blockchain nodes are different. As such, an association can be ignored. Therefore, it is difficult to associate the second service data with the industry, and it is difficult to infer authentic information that corresponds to digital addresses such as source addresses and destination addresses.

It can be seen from the previous description that the three pieces of first service data each include one first source address and one first destination address, which is merely an example. In another implementation of the present application, the first service data can include more than one first source address and/or more than one first destination address. In this case, although a certain association may exist between a plurality of first source addresses and a plurality of first destination addresses in the first service data, in created second service data, the first source addresses in the first service data are mixed with a first source address in other first service data, and the first destination addresses in the first service data are mixed with a first destination address in other first service data. In addition, because the first service data provides more than one first source address and/or more than one first destination address, the second service data is more confusing.

It is worthwhile to note that in the previous implementation, only three pieces of first service data are selected to describe the solution, but are not intended to limit the protection scope of the solution. In specific application, the second service data can include another amount of first service data.

It is worthwhile to note that, in step 202, if the second blockchain node sends the service processing request to the server, the second blockchain node creates the second service data based on the first service data. In this process, the second blockchain node can create the second service data based on the first service data and third service data that corresponds to the service processing request.

If the second blockchain node is not a blockchain node that sends a service processing request to the server, the second blockchain node creates the second service data based on the first service data. In this process, the second blockchain node creates the second service data based on only the first service data.

Step 206: Send the second service data to the first blockchain node, so that the first blockchain node checks the second service data.

The first blockchain node checks the corresponding first service data included in the second service data, and the corresponding first service data is sent by the first blockchain node to the second blockchain node. The first blockchain node can determine whether the first source address and the first destination address are correct, whether an object expended from the first source address is correct, and whether the corresponding first destination address receives an object of the same size.

If the first service data is correct, the first blockchain node sends acknowledgement information to the second blockchain node, and the second blockchain node receives the acknowledgement information fed back by the first blockchain node.

If the first service data is incorrect, the first blockchain node sends correction information to the second blockchain node. After receiving the correction information fed back by the first blockchain node, the second blockchain node corrects the second service data based on the correction information, and then sends the corrected second service data to the first blockchain node for check, until the acknowledgement information is received.

The sending the second service data to the first blockchain node can include: sending the second service data to the first blockchain nodes in sequence only after acknowledgement information sent by a current first blockchain node is received, sending the second service data to the next first blockchain node; or sending, by the second blockchain node, the second service data to one of the first blockchain nodes, and instructing the first blockchain node to automatically send the second service data to the next first blockchain node after the first blockchain node determines that the second service data is correct, until acknowledgment information that is sent by each first blockchain node after the first blockchain node checks the second service data is received.

In this implementation of the present application, the encrypted second service data can be sent to the first blockchain node.

Step 208: Process the second service data when acknowledgement information sent by the first blockchain node is received.

In this implementation of the present application, the processing the second service data can include: transmitting a service object based on the second source address and the second destination address that are included in the second service data.

Alternatively, the processing the second service data can include: sending the second service data to a consensus node in a blockchain network, so that the consensus node performs consensus processing on the second service data; and if the second service data is verified, storing the second service data in the blockchain network.

The first blockchain node can add a digital signature to the second service data as a basis of the acknowledgement information. That the consensus node performs consensus processing on the second service data can include: verifying whether first service data corresponding to each digital signature is authentic and valid.

Figure 4:
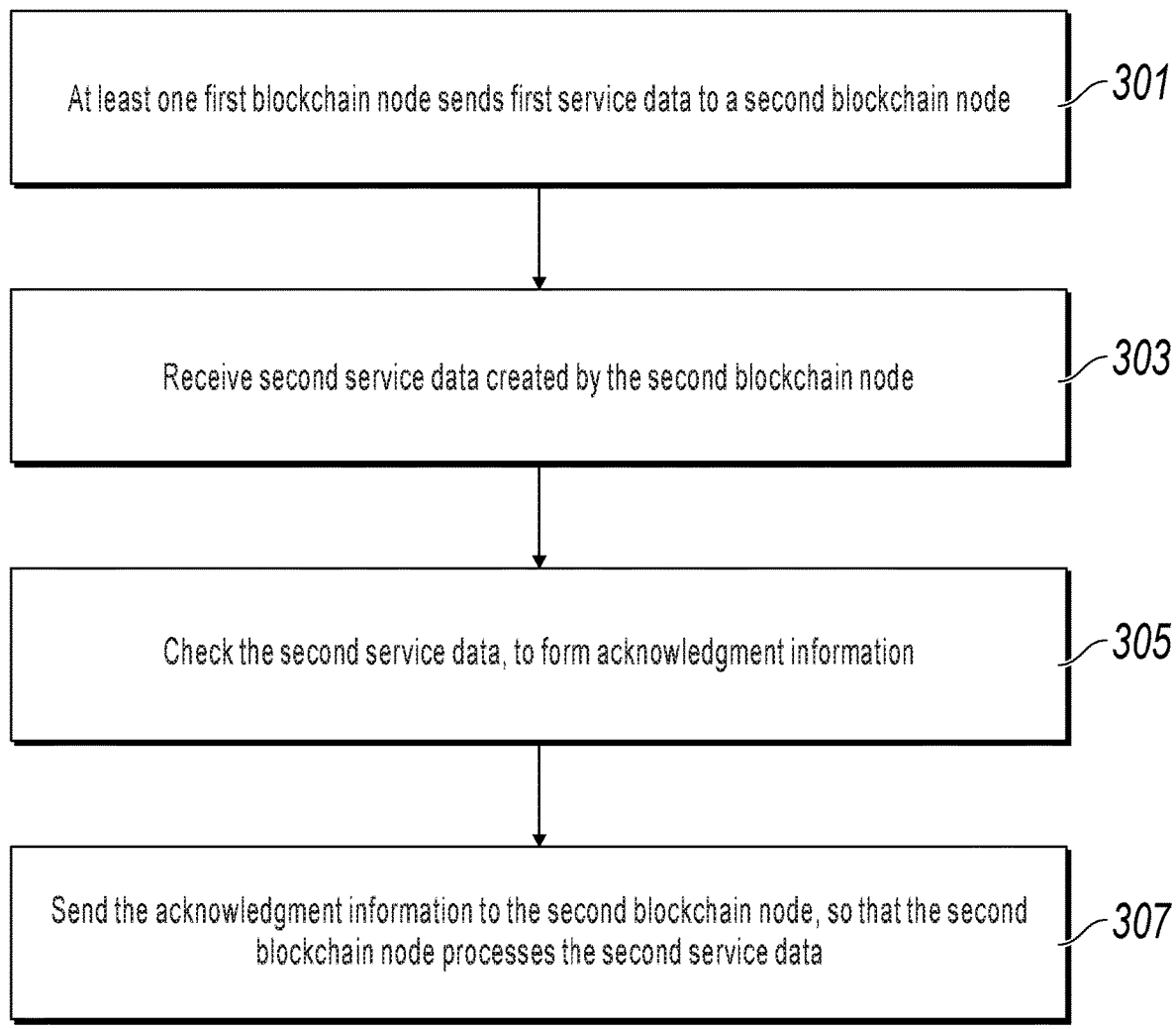
FIG. 4 is a flowchart illustrating a service data processing method, according to an implementation of the present application.

FIG. 4 is a flowchart illustrating a service data processing method, according to an implementation of the present application. The method is shown below. The service data processing method is performed by a blockchain node. The blockchain node is described as a first blockchain node named to be distinguished from a second blockchain node.

Step 301: The first blockchain node sends first service data to the second blockchain node, where the first service data includes a first source address and a first destination address.

In actual application, a set number of first blockchain nodes send first service data to the second blockchain node, so that the first service data included in subsequent second service data is more confusing.

In this implementation of the present application, before sending the first service data to the second blockchain node, the first blockchain node can determine the second blockchain node in the following method: sending a service processing request to a server, where the service processing request is used to notify the server of a service data processing requirement; receiving feedback information returned by the server, where the feedback information includes node identifiers of blockchain nodes that send service processing requests to the server; and determining the second blockchain node based on a node identifier included in the feedback information.

Specifically, the first blockchain node can determine the second blockchain node based on the node identifiers included in the feedback information by using the following two methods.

Method 1 includes: selecting one of the node identifiers included in the feedback information; sending, for the selected node identifier, a consensus request to the blockchain nodes that correspond to the node identifiers included in the feedback information, where the consensus request is used to request the blockchain nodes to agree that a blockchain node that corresponds to the selected node identifier is the second blockchain node; and if the blockchain nodes agree that the blockchain node that corresponds to the selected node identifier is the second blockchain node, determining the blockchain node that corresponds to the selected node identifier as the second blockchain node.

Method 2 includes: determining the second blockchain node based on the node identifier for instructing to create the second service data in the feedback information. In this case, the second blockchain node is determined by the server, and is notified to the first blockchain node.

To keep information equivalence, that the first blockchain node sends first service data to the second blockchain node can include: the first blockchain node sends the first service data to the second blockchain node and/or a blockchain node that corresponds to a node identifier fed back by a server. In this case, a first blockchain node in a first blockchain node set can obtain first service data of another first blockchain node, so as to implement information equivalence.

Step 303: Receive second service data created by the second blockchain node, where the second service data includes a second source address and a second destination address, the second source address includes the first source address, and the second destination address includes the first destination address.

Step 305: Check the second service data.

Step 307: Send acknowledgement information to the second blockchain node, so that the second blockchain node processes the second service data.

For step 305, references can be made to the content of step 206 in the previous implementation. If the first blockchain node determines that the second service data is correct, the first blockchain node sends the acknowledgement information to the second blockchain node. If the first blockchain node determines that the second service data is incorrect, the first blockchain node sends correction information to the second blockchain node. The correction information can be used to request the second blockchain node to correct the second service data, or the correction information can be corrected second service data.

Figure 5:
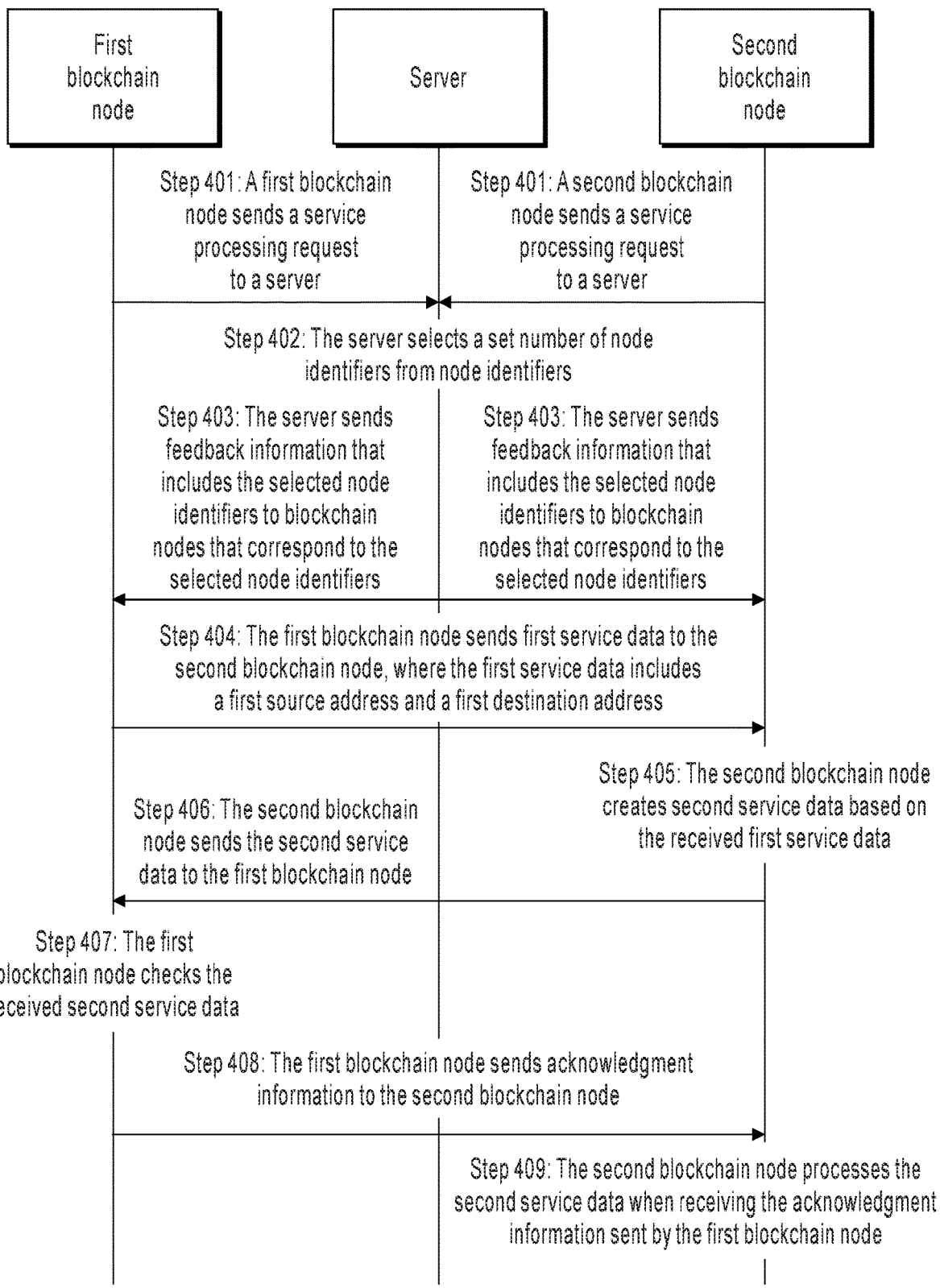
FIG. 5 is a flowchart illustrating a service data processing method, according to an implementation of the present application.

FIG. 5 is a flowchart illustrating a service data processing method, according to an implementation of the present application. The method is shown below.

Step 401: A first blockchain node and a second blockchain node send service processing requests to a server, where the service processing requests are used to notify the server of a service data processing requirement, and the service processing requests include node identifiers.

Step 402: The server selects a set number of node identifiers from the node identifiers.

Step 403: The server sends feedback information that includes the selected node identifiers to blockchain nodes that correspond to the selected node identifiers.

Step 404: The first blockchain node sends first service data to the second blockchain node, where the first service data includes a first source address and a first destination address.

Step 405: The second blockchain node creates second service data based on the received first service data, where the second service data includes a second source address and a second destination address, the second source address includes the first source address, and the second destination address includes the first destination address.

Step 406: The second blockchain node sends the second service data to the first blockchain node.

Step 407: The first blockchain node checks the received second service data.

Step 408: The first blockchain node sends acknowledgement information to the second blockchain node.

Step 409: The second blockchain node processes the second service data when receiving the acknowledgement information sent by the first blockchain node.

The service data processing method and the service processing method provided in the implementations of the present application have the following advantages:

The second service data can include first service data of a plurality of first blockchain nodes. Therefore, the first blockchain nodes may not need to separately provide a plurality of source addresses or destination addresses, which can reduce the burden of the first blockchain nodes.

Predictably, the number of first blockchain nodes is not specified, therefore, the second service data can be created by using a relatively large amount of first service data. As such, the second source address and the second destination address in the second service data are more confusing, second service data in the blockchain network is less associated with each other, and authentic information of a blockchain node is less likely to leak.

Figure 6:
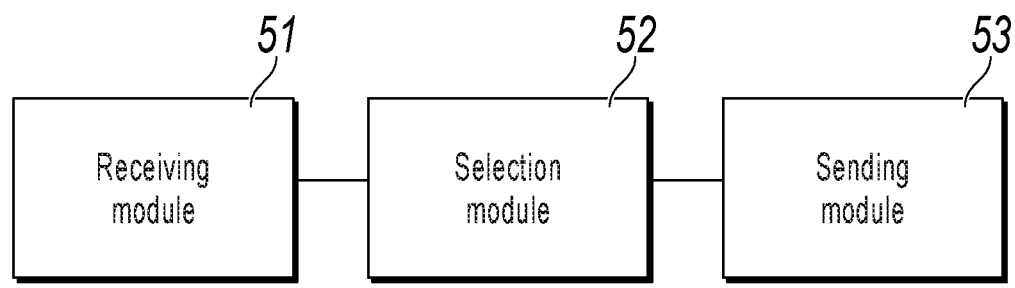
FIG. 6 is a structural diagram illustrating a service processing device, according to an implementation of the present application.

FIG. 6 is a structural diagram illustrating a service processing device, according to an implementation of the present application. The service processing device can include: a receiving module 51, configured to receive service processing requests sent by blockchain nodes, where the service processing requests are used to notify a server of a service data processing requirement, and the service processing requests include node identifiers; a selection module 52, configured to select a set number of node identifiers from the node identifiers; and a sending module 53, configured to send feedback information that includes the selected node identifiers to blockchain nodes that correspond to the selected node identifiers, so that one of the blockchain nodes creates second service data based on first service data sent by the blockchain nodes, and processes the second service data.

Optionally, that the selection module 52 selects a set number of node identifiers from the node identifiers includes: if the received service processing requests include quantity information, selecting node identifiers that satisfy the quantity information from the node identifiers based on the quantity information.

Optionally, the selection module 52 further determines a second blockchain node based on the service processing requests after selecting the set number of node identifiers from the node identifiers. The second blockchain node is configured to receive the first service data sent by the blockchain nodes that correspond to the selected node identifiers, then create the second service data based on the first service data, and process the second service data.

Optionally, that the sending module 53 sends feedback information that includes the selected node identifiers to blockchain nodes that correspond to the selected node identifiers includes: sending, to the blockchain nodes, the feedback information that includes the selected node identifiers and includes an instruction that the second blockchain node creates the second service data.

It is worthwhile to note that the service processing device in this implementation of the present application can be implemented by using software or hardware. This is not limited here.

Based on the same inventive concept, an implementation of the present application further provides a service processing device. The service processing device includes at least one processor and a memory. The memory stores a program, and the program is used by the at least one processor to perform the following steps: receiving service processing requests sent by blockchain nodes, where the service processing requests are used to notify a server of a requirement for creating second service data by using first service data, and the service processing requests include node identifiers of the blockchain nodes; selecting a set number of blockchain nodes from the blockchain nodes as first blockchain nodes based on the service processing requests; and separately sending node identifiers of the selected first blockchain nodes to the first blockchain nodes, so that a second blockchain node among the first blockchain nodes receives the first service data sent by the first blockchain nodes, creates the second service data based on the first service data, and processes the second service data.

For other functions of the processor, references can be made to content described in the above implementations. Details are not described here again.

Based on the same inventive concept, an implementation of the present application further provides a computer-readable storage medium. The computer-readable storage medium includes a program that is used together with an electronic device, and a processor can execute the program to perform the following steps: receiving service processing requests sent by blockchain nodes, where the service processing requests are used to notify a server of a requirement for creating second service data by using first service data, and the service processing requests include node identifiers of the blockchain nodes; selecting a set number of blockchain nodes from the blockchain nodes as first blockchain nodes based on the service processing requests; and separately sending node identifiers of the selected first blockchain nodes to the first blockchain nodes, so that a second blockchain node among the first blockchain nodes receives the first service data sent by the first blockchain nodes, creates the second service data based on the first service data, and processes the second service data.

For other functions of the processor, references can be made to content described in the above implementations. Details are not described here again.

The service processing device or the computer-readable storage medium here is configured to allocate blockchain nodes based on received service processing requests, to effectively organize blockchain nodes that have a service data processing requirement, so that service processing is more well-ordered and efficient.

Figure 7:
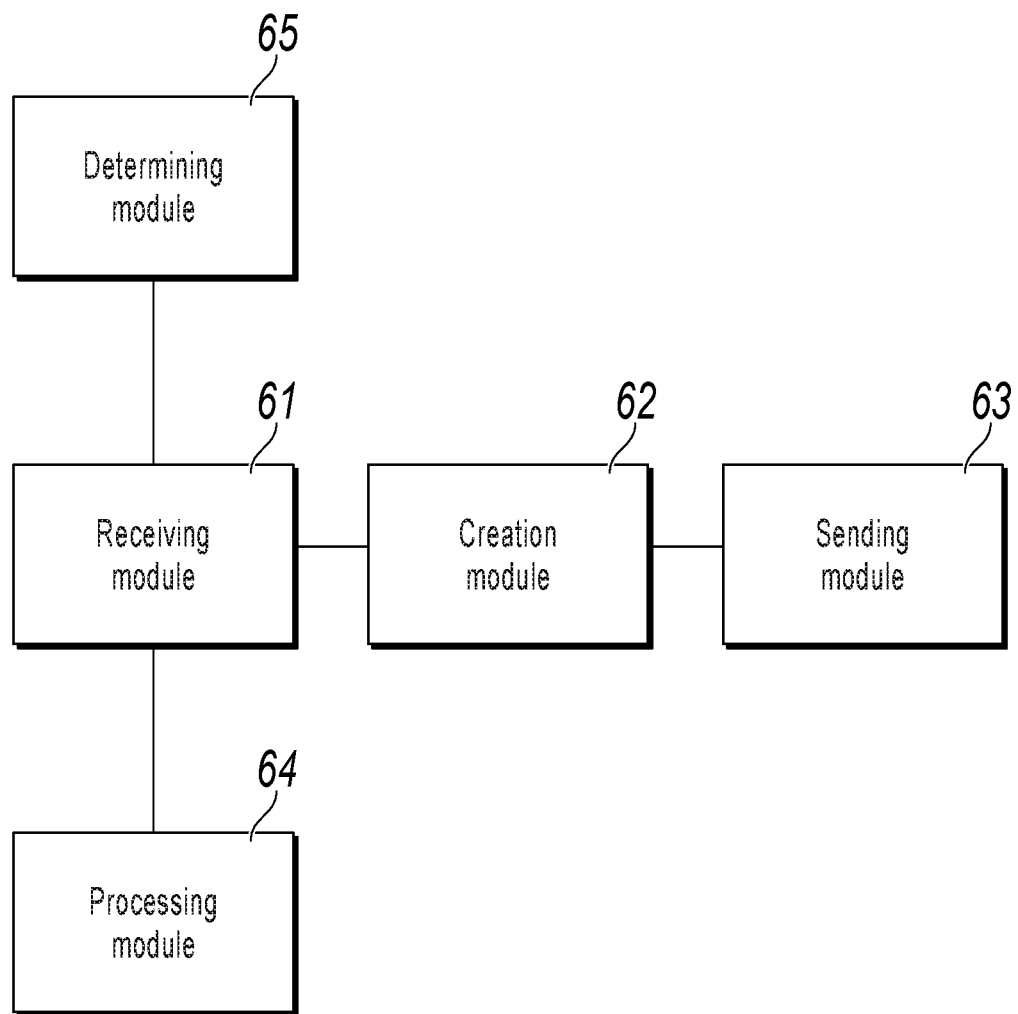
FIG. 7 is a structural diagram illustrating a service data processing device, according to an implementation of the present application.

FIG. 7 is a structural diagram illustrating a service data processing device, according to an implementation of the present application. The service data processing device can include: a receiving module 61, configured to receive first service data sent by at least one first blockchain node, where the first service data includes a first source address and a first destination address; a creation module 62, configured to create second service data based on the first service data, where the second service data includes a second source address and a second destination address, the second source address includes the first source address, and the second destination address includes the first destination address; a sending module 63, configured to send the second service data to the first blockchain node, so that the first blockchain node checks the second service data; and a processing module 64, configured to process the second service data when acknowledgement information sent by the first blockchain node is received.

Optionally, that the processing module 64 processes the second service data includes: sending the second service data to a consensus node in a blockchain network, so that the consensus node performs consensus processing on the second service data; and if the second service data is verified, storing the second service data in the blockchain network.

Optionally, the sending module 63 sends a service processing request to a server before the receiving module 61 receives the first service data sent by the at least one first blockchain node. The service processing request is used to notify the server of a service data processing requirement.

Optionally, the service data processing device further includes a determining module 65.

The receiving module 61 receives feedback information returned by the server, where the feedback information includes node identifiers of blockchain nodes that send service processing requests to the server.

The determining module 65 determines the first blockchain node based on a node identifier included in the feedback information.

Optionally, that the determining module 65 determines the first blockchain node based on a node identifier included in the feedback information includes: determining a blockchain node that corresponds to the node identifier included in the feedback information as the first blockchain node; or selecting a set number of node identifiers from the node identifiers included in the feedback information, and determining blockchain nodes that correspond to the selected node identifiers as the first blockchain nodes.

Optionally, that the sending module 63 sends a service processing request to a server includes: adding quantity information to the service processing request, and sending the service processing request to the server, so that the server selects blockchain nodes that satisfy the quantity information from blockchain nodes that send service processing requests.

Optionally, the sending module 63 sends third service data to the first blockchain node.

That the creation module 62 creates second service data based on the first service data includes: creating the second service data based on the first service data and the third service data.

Optionally, that the sending module 63 sends third service data to the first blockchain node includes: sending the encrypted third service data to the first blockchain node.

It is worthwhile to note that the service data processing device in this implementation of the present application can be implemented by using software or hardware. This is not limited here.

Based on the same inventive concept, an implementation of the present application further provides a service data processing device. The service data processing device includes at least one processor and a memory. The memory stores a program, and the program is used by the at least one processor to perform the following steps: receiving first service data sent by at least one first blockchain node, where the first service data includes a first source address and a first destination address; creating second service data based on the first service data, where the second service data includes a second source address and a second destination address, the second source address includes the first source address, and the second destination address includes the first destination address; sending the second service data to the first blockchain node, so that the first blockchain node checks the second service data; and processing the second service data when acknowledgement information sent by the first blockchain node is received.

For other functions of the processor, references can be made to content described in the above implementation. Details are not described here again.

Based on the same inventive concept, an implementation of the present application further provides a computer-readable storage medium. The computer-readable storage medium includes a program that is used together with an electronic device, and a processor can execute the program to perform the following steps: receiving first service data sent by at least one first blockchain node, where the first service data includes a first source address and a first destination address; creating second service data based on the first service data, where the second service data includes a second source address and a second destination address, the second source address includes the first source address, and the second destination address includes the first destination address; sending the second service data to the first blockchain node, so that the first blockchain node checks the second service data; and processing the second service data when acknowledgement information sent by the first blockchain node is received.

For other functions of the processor, references can be made to content described in the above implementation. Details are not described here again.

The service data processing device or the computer-readable storage medium here can be configured to create the second service data based on the first service data sent by the first blockchain node, so that the first service data is confused with each other, and authentic information that corresponds to the first blockchain node cannot leak. In addition, the service data processing device can process the second service data after a plurality of first service data are mixed and checked, so as to improve service processing efficiency.

Figure 8:
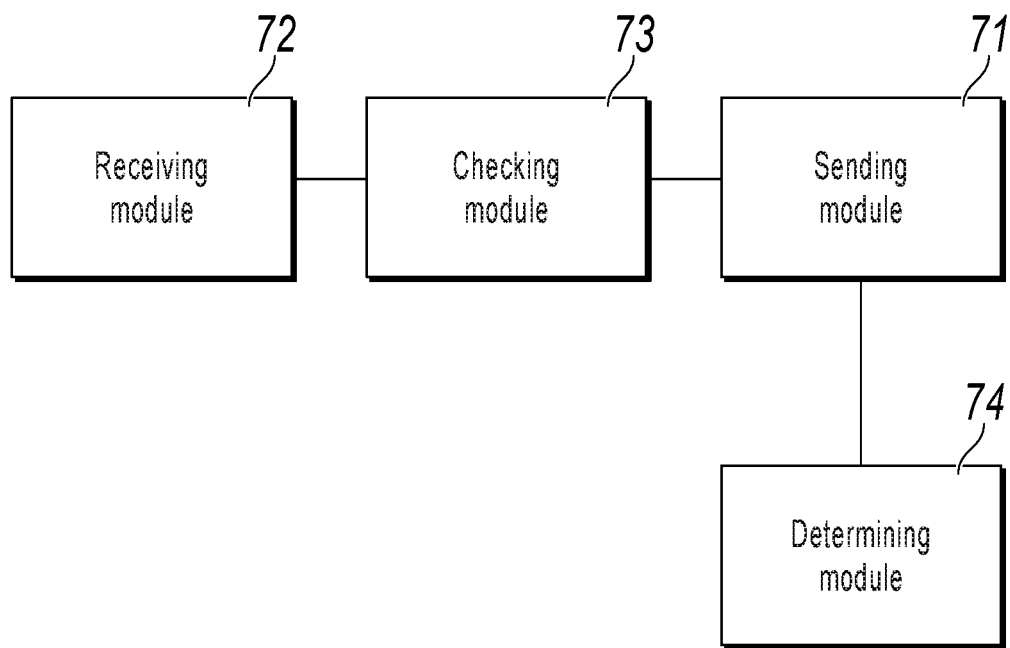
FIG. 8 is a structural diagram illustrating a service data processing device, according to an implementation of the present application.

FIG. 8 is a structural diagram illustrating a service data processing device, according to an implementation of the present application. The service data processing device can include: a sending module 71, configured to send first service data to a second blockchain node, where the first service data includes a first source address and a first destination address; a receiving module 72, configured to receive second service data created by the second blockchain node, where the second service data includes a second source address and a second destination address, the second source address includes the first source address, and the second destination address includes the first destination address; and a checking module 73, configured to check the second service data.

The sending module 71 sends acknowledgement information to the second blockchain node, so that the second blockchain node processes the second service data.

Optionally, the service data processing device further includes a determining module 74.

The sending module 71 sends a service processing request to a server before sending the first service data to the second blockchain node, where the service processing request is used to notify the server of a service data processing requirement.

The receiving module 72 receives feedback information returned by the server, where the feedback information includes node identifiers of blockchain nodes that send service processing requests to the server.

The determining module 74 determines the second blockchain node based on a node identifier included in the feedback information.

Optionally, that the determining module 74 determines the second blockchain node based on a node identifier included in the feedback information includes: selecting one of the node identifiers included in the feedback information; sending, for the selected node identifier, a consensus request to the blockchain nodes that correspond to the node identifiers included in the feedback information, where the consensus request is used to request the blockchain nodes to agree that a blockchain node that corresponds to the selected node identifier is the second blockchain node; and if the blockchain nodes agree that the blockchain node that corresponds to the selected node identifier is the second blockchain node, determining the blockchain node that corresponds to the selected node identifier as the second blockchain node.

Optionally, that the determining module 74 determines the second blockchain node based on a node identifier included in the feedback information includes: determining the second blockchain node based on the node identifier of the second blockchain node that is included in the feedback information, and based on an instruction that the second blockchain node creates the second service data.

Optionally, that the sending module 71 sends first service data to a second blockchain node includes: sending the first service data to the second blockchain node and/or a blockchain node that corresponds to a node identifier fed back by a server.

It is worthwhile to note that the service data processing device in this implementation of the present application can be implemented by using software or hardware. This is not limited here.

Based on the same inventive concept, an implementation of the present application further provides a service data processing device. The service data processing device includes at least one processor and a memory. The memory stores a program, and the program is used by the at least one processor to perform the following steps: sending first service data to a second blockchain node, where the first service data includes a first source address and a first destination address; receiving second service data created by the second blockchain node, where the second service data includes a second source address and a second destination address, the second source address includes the first source address, and the second destination address includes the first destination address; checking the second service data; and sending acknowledgement information to the second blockchain node, so that the second blockchain node processes the second service data.

For other functions of the processor, references can be made to content described in the above implementation. Details are not described here again.

Based on the same inventive concept, an implementation of the present application further provides a computer-readable storage medium. The computer-readable storage medium includes a program that is used together with an electronic device, and a processor can execute the program to perform the following steps: sending first service data to a second blockchain node, where the first service data includes a first source address and a first destination address; receiving second service data created by the second blockchain node, where the second service data includes a second source address and a second destination address, the second source address includes the first source address, and the second destination address includes the first destination address; checking the second service data; and sending acknowledgement information to the second blockchain node, so that the second blockchain node processes the second service data.

For other functions of the processor, references can be made to content described in the above implementation. Details are not described here again.

It can be obviously identified whether a technology is improved in terms of hardware (for example, a circuit structure, such as a diode, a transistor, or a switch is improved) or is improved in terms of software (a method procedure is improved). However, as technologies develop, current improvement for many method procedures can be considered as a direct improvement to a hardware circuit structure. A designer usually programs an improved method procedure to a hardware circuit, to obtain a corresponding hardware circuit structure. Therefore, a hardware module can improve a method procedure. For example, a programmable logic device (PLD) (for example, a field programmable gate array (FPGA)) is such an integrated circuit, and a logical function of the programmable logic device is determined by a user through device programming. The designer "integrates" a digital system to a PLD through programming without requesting a chip manufacturer to design and produce an application-specific integrated circuit chip. In addition, instead of manually making an integrated circuit chip, the programming is mostly implemented by modifying "logic compiler" software today, which is similar to a software compiler used for program development and compiling. Original code before compiling is also written in a specific programming language, which is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). Currently, the Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the described hardware description languages and is programmed into an integrated circuit.

A controller can be implemented in any appropriate way. For example, the controller can be a microprocessor, a processor, or a computer-readable medium, a logic gate, a switch, an application-specific integrated circuit (ASIC), a programmable logic controller, or an embedded microcontroller that stores computer-readable program code (for example, software or firmware) that can be executed by the processor or the microprocessor. Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that a controller can be implemented in a method of pure computer-readable program code, and the steps in the method can be logically programmed to enable the controller to implement same functions in forms of a logical gate, a switch, an application-specific integrated circuit, a programmable logic controller, an embedded microcontroller, etc. Therefore, the controller can be considered as a hardware component, and an apparatus configured to implement various functions in the controller can also be considered as a structure in a hardware component. Alternatively, an apparatus configured to implement various functions can be considered as a software module that can implement the method, or a structure in a hardware component.

The system, apparatus, module, or unit described in the above implementations can be specifically implemented by a computer chip or an entity, or implemented by a product with a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of these devices.

For ease of description, the described apparatus is described by dividing functions into various units. Certainly, when the present application is implemented, the functions of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a magnetic disk storage, a CD-ROM, an optical memory, etc.) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions can be stored in a computer-readable memory that can instruct the computer or another programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. As such, the instructions executed on the computer or the another programmable device provide steps for implementing a specific function in one or more processes in the flowcharts and/or in one or more blocks in the block diagrams.

In typical configuration, a computing device includes one or more processors (CPU), an input/output interface, a network interface, and a memory.

The memory can include a volatile memory, a random access memory (RAM), and/or a nonvolatile memory, etc. in a computer-readable medium, such as a read-only memory (ROM) or a flash memory. The memory is an example of the computer-readable medium.

The computer-readable medium includes volatile and non-volatile, removable and non-removable media, and can store information by using any method or technology. The information can be a computer-readable instruction, a data structure, a program module, or other data. Examples of a computer storage medium include but are not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium that can be used to store information that a computing device can access. As described in this specification, the computer-readable medium does not include transitory media, for example, a modulated data signal and a carrier.

It is worthwhile to further note that, the terms "include", "comprise", or any other variant is intended to cover non-exclusive inclusion, so that a process, a method, an article, or a device that includes a series of elements not only includes these elements, but also includes other elements that are not expressly listed, or further includes elements inherent to such a process, method, article, or device. An element preceded by "includes a . . . " does not, without more constraints, exclude the existence of additional identical elements in the process, method, article, or device that includes the element.

The present application can be described in common contexts of computer executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

The implementations in this specification are all described in a progressive way. For same or similar parts in the implementations, references can be made to these implementations. Each implementation focuses on a difference from other implementations. Especially, a system implementation is basically similar to a method implementation, and is described briefly. For related parts, references can be made to related descriptions in the method implementation.

The above descriptions are merely implementations of the present application, and are not intended to limit the present application. For a person skilled in the art, the present application can have various modifications and changes. Any modifications, equivalent replacements, improvements, etc. made within the spirit and principle of the present application shall fall within the protection scope of the claims of the present application.

Figure 9:
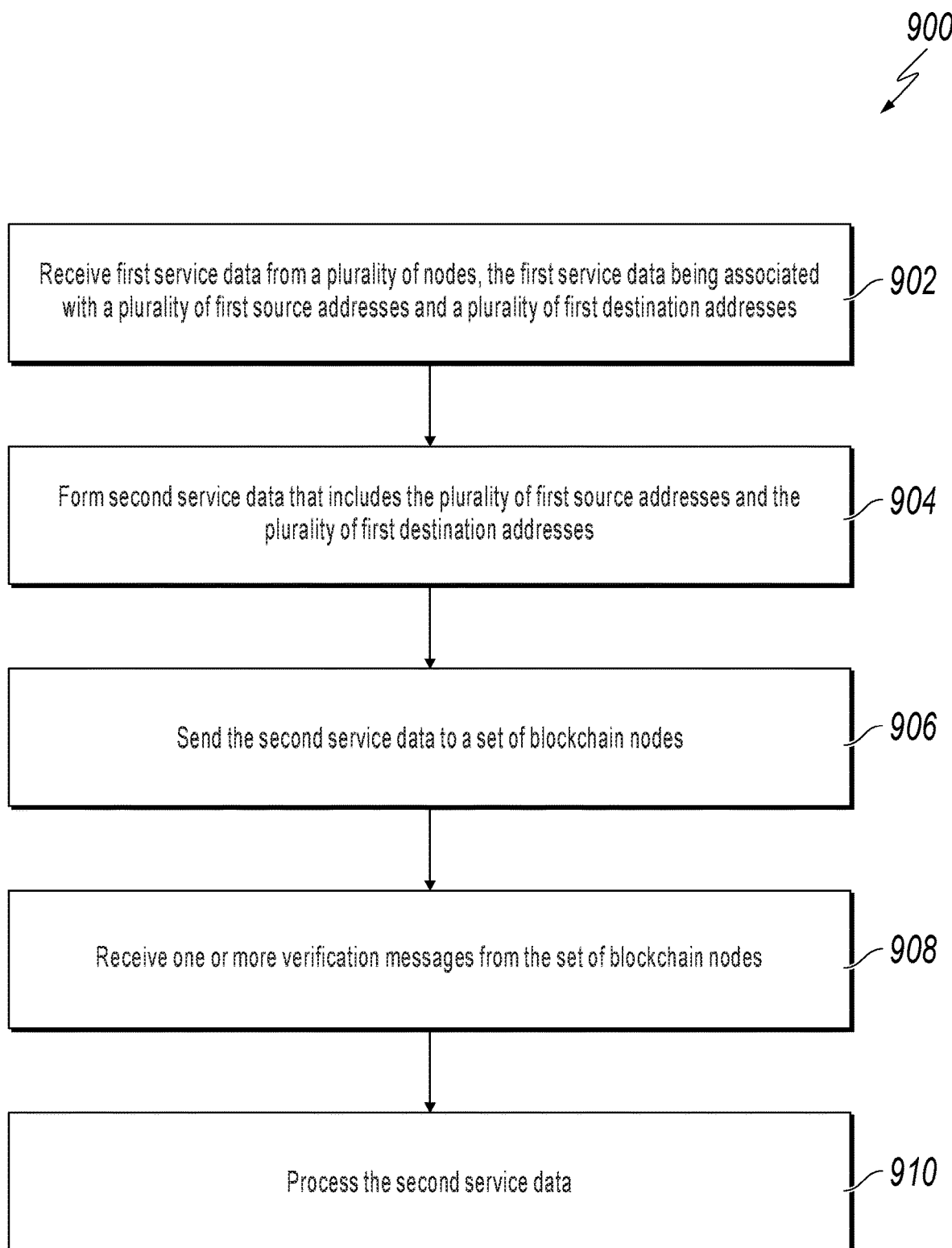
FIG. 9 is a flowchart illustrating an example of a computer-implemented method 900 for anonymizing service data information, according to an implementation of the present disclosure.

FIG. 9 is a flowchart illustrating an example of a computer-implemented method 900 for anonymizing service data information, according to an implementation of the present disclosure. The method 900 can be performed by one or more processors in the second blockchain node, as explained with reference to the implementations described above. For example, the method 900 can be performed by the service data processing device explained with reference to FIG. 7. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, first service data is received from a plurality of nodes. The first service data is associated with a plurality of first source addresses and a plurality of first destination addresses. For example, the first service data received from each node of the plurality of nodes can be associated with a first source address and a first destination address. The first service data can be associated with multiple data transfers between blockchain nodes. Each data transfer may correspond to a service object (e.g., transfer of currency) between a source node and a destination node. Accordingly, the first service data can include multiple service objects, multiple source addresses, and multiple destination addresses associated with the multiple data transfers. From 902, method 900 proceeds to 904.

At 904, second service data is formed. The second service data includes a second source address and a second destination address. The second source address includes the plurality of the first source addresses associated with the first service data. The second destination address includes the plurality of first destination addresses associated with the first service data. FIG. 3 provides an example second service data. The second service data in FIG. 3 has a second source address that includes three first source addresses, and a second destination address that includes three first destination addresses. The second service data can also include a plurality of service objects associated with the first service data. The second service data in FIG. 3 includes three service objects S10, S20, and S30. The source addresses and the destination addresses in the second service data are not corresponding to each other. Accordingly, it is not clear what source and what destination addresses were associated to each other (e.g., associated to a data transfer). Similarly, the service objects can be mixed so that it is not clear which data object was performed (e.g., transferred) from which source address to which destination address. From 904, method 900 proceeds to 906.

At 906, the second service data is sent to a set of blockchain nodes (e.g., a first blockchain node). The set of blockchain nodes includes one or more nodes of the plurality of blockchain nodes. Each node in the set of blockchain nodes reviews the second source data to determine whether the data provided by the node in 902 is included in the second source data. For example, each node can determine whether the second source address includes a first source address provided by the node. Similarly, each node can determine whether the second source address includes the first destination address and/or the first service object provided by the node. The set of blockchain nodes can be a set randomly selected from the plurality of the nodes. The number of nodes in the set can be determined based on a rule, or based on a default number (e.g., one node). From 906, the method 900 proceeds to 908.

At 908, one or more verification messages are received from the set of blockchain nodes. For example, each node of the set of blockchain nodes may send a verification message. The verification message received from a node verifies that the second service data includes a part of the first service data provided by the node. From 908, method 900 proceeds to 910.

At 910, the second service data is processes. For example, when the first service data includes currency transactions between the multiple nodes, the second service data can be processed to add up the transactions and provide a total amount of the transactions between one set of nodes to another set of nodes in the blockchain network.

The second service data is processed in response to receiving the verification message from all nodes in the set of nodes. In some implementations, when one or more nodes determine that their respective parts in the first service data are not included in the second service data, the one or more nodes send out a fault message instead of a verification message. The fault message indicates that the second service data lacks at least part of the first service data. The fault message sent by a node can include a part of the first service data provided by the node. Using the information of the fault message, the second service data can be updated to include the part of the first service data provided by the node.

As explained above, the method 900 can be performed by a second node. The second node can be a node of the plurality of nodes, or can be a node independent from the plurality of nodes. The second node can be determined by a server, or based on a consensus between the nodes of the plurality of nodes.

The server can determine the nodes of the plurality of nodes. For example, the server may receive service data processing requests from nodes of the blockchain. The server can determine a plurality of nodes from among the nodes that have sent service processing requests. The number of nodes in the plurality of nodes can be determined based on a default number, or based on a quantity information included in one or more service data processing requests. The quantity information received from a requesting node indicates the number of nodes to be included in a plurality of nodes that will include the requesting node. For example, the quantity information can include a maximum, a minimum, a range, or an exact number of nodes.

Upon determining the plurality of nodes, the server sends a feedback information to each of the nodes in the plurality of nodes. The feedback information includes identity of each node (also referred to as "node identifier" herein) in the plurality of nodes. The server may also determine the second node (which is responsible for performing method 900) and transmit the identity of the second node as part of the feedback information. The feedback information can include an instruction for the second node. The instruction can include details for performing method 900, such as the number of nodes (or a rule for determining the number of nodes) in the set of nodes in 906.

In some implementations, the second node is selected by the nodes of the plurality of nodes. For example, the feedback information allows the nodes of the plurality of nodes to know about their association with the plurality of nodes. A node in the plurality of nodes can select a node (e.g., from among the plurality of nodes) as the second node and send a consensus request to the other nodes in the plurality of nodes asking for their consensus on assigning the selected node as the second node. Upon receiving a consensus from all (or some, e.g., a majority) of the nodes in the plurality of nodes, the selected node can be assigned as the second node.

In some implementations, in response to receiving the verification message from all nodes of the set of blockchain nodes, the second service data is stored in the blockchain network. For example, the second service data can be stored in multiple nodes of the blockchain nodes. One or more nodes of the multiple nodes can be other than (i.e., outside) the nodes of the plurality of nodes. In some implementations, each node of the plurality of nodes includes a digital signature in the first service data, and the second service data is stored in the blockchain network in response to determining that signature of all nodes of the plurality of nodes is included in the second service data. For example, the second service data may be sent to a consensus node that checks the digital signatures in the second service data against the node identifiers in the feedback information. Upon receiving a confirmation message from the consensus node confirming that signature of all nodes of the plurality of nodes are included in the second service data, the second service data can be stored in the blockchain network. The consensus node can be a node of the plurality of nodes, or can be a node independent of the plurality of nodes. For example, the server may identify the consensus node in the instructions part in the feedback information.

A blockchain is a decentralized network that records data transfers in multiple nodes (as opposed to recording in one node in a centralized network). Accordingly, a record of a data transfer in a blockchain cannot be altered without alteration of the records in multiple nodes. Each record includes service data of the data transfers. The service data includes a source address, a destination address, and a service object associated with the data transfer. For example, a service data may be a transfer of currency (e.g., dolor) from a first node to a second node of the blockchain. In a blockchain, the content of service data can be easily identified, which leads to security issues such as leak of sensitive data (e.g., bank account information, transaction amounts, etc.). For example, the source and destination addresses and the monetary value associated with a transfer of currency can be identified from the records in blockchain nodes.

Implementations of the present disclosure provide techniques to improve the security in blockchains by anonymizing the information of the service data. The implementations combine information of multiple data transfers to anonymize the source, the destination, and/or the service object of each of the data transfers. For example, instead of recording the service data for each data transfer, the implementations record data of multiple data transfers without recording a one-to-one relationship between the source and the destinations of the data transfers. Accordingly, while the data transfers are still recorded across multiple nodes, details of each data transfer is dull.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

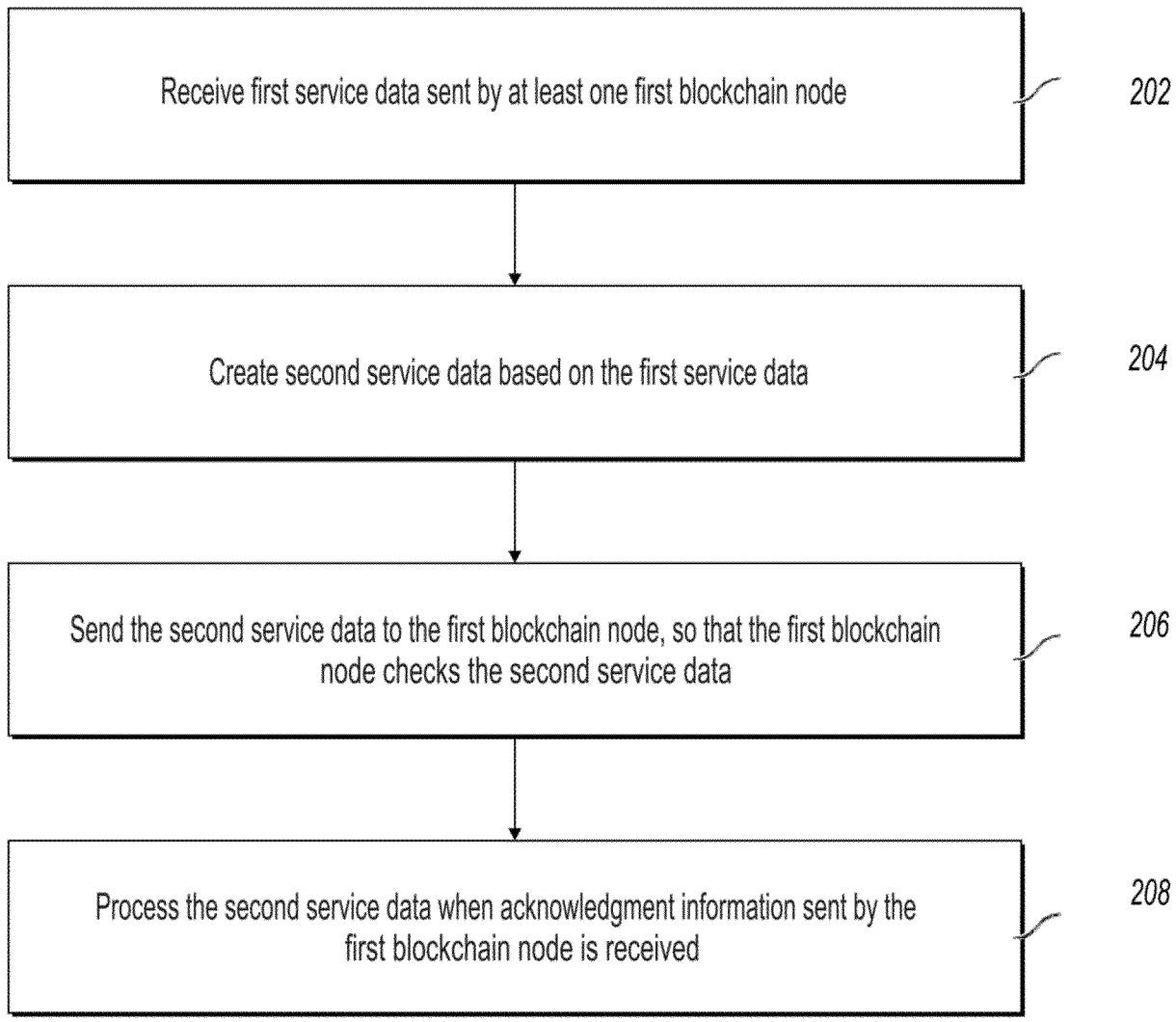

What is claimed is:

1. A computer-implemented method executed by one or more processors, the method comprising:
   receiving, by the one or more processors, from each of a first plurality of blockchain nodes in a blockchain network a respective first service data, wherein each of the respective first service data is associated with a respective first source address and a respective first destination address;
   determining, by the one or more processors, information equivalences in a plurality of first service data received from the first plurality of blockchain nodes;
   forming, by the one or more processors, second service data comprising a second source address corresponding to the first plurality of blockchain nodes and a second destination address corresponding to a second plurality of blockchain nodes, wherein the second source address is formed based on the information equivalences determined within the plurality of first service data corresponding to a plurality of first source addresses and a plurality of first destination addresses associated with the plurality of first service data;
   sending, by the one or more processors, the second service data to a blockchain node of the first plurality of blockchain nodes with a verification request to verify that the second service data comprises at least a part of the first service data provided by the blockchain node;
   receiving, by the one or more processors, a verification message from the blockchain node confirming verification that the second service data comprises at least the part of the first service data provided by the blockchain node; and
   in response to receiving the verification message from the blockchain node, processing, by the one or more processors, the second service data.

2. The computer-implemented method of claim 1, further comprising storing, by the one or more processors, the second service data in the blockchain network in response to receiving the verification message from the blockchain node.

3. The computer-implemented method of claim 1, further comprising:
   sending, by the one or more processors, the second service data to a consensus node in the blockchain network, wherein the consensus node verifies digital signatures of the second plurality of blockchain nodes in the second service data, wherein the digital signatures are provided by the first plurality of blockchain nodes as part of the plurality of first service data,
   wherein the second service data is processed in response to receiving a confirmation from the consensus node confirming the digital signatures in the second service data associate with the second plurality of blockchain nodes.

4. The computer-implemented method of claim 1, further comprising:
   receiving, by the one or more processors, a feedback information from a server, the feedback information comprising a plurality of node identifiers associated with the first plurality of blockchain nodes, wherein the server sends the feedback information in response to receiving requests for service data processing from the first plurality of blockchain nodes.

5. The computer-implemented method of claim 4, wherein the blockchain node is a first blockchain node and the one or more processors are parts of a second blockchain node that is one of the first plurality of blockchain nodes.

6. The computer-implemented method of claim 4, wherein the blockchain node is a first blockchain node and the one or more processors are parts of a second blockchain node that is determined based on a consensus between blockchain nodes in the first plurality of blockchain nodes.

7. The computer-implemented method of claim 4, wherein number of nodes in the first plurality of blockchain nodes is determined by the server and based on a quantity information, the quantity information indicating the number of nodes and being included in at least one request for service data processing received from a respective blockchain node in the first plurality of blockchain nodes.

8. The computer-implemented method of claim 1, further comprising:
   receiving, by the one or more processors, a fault message indicating that the second service data comprises a part of the plurality of first service data provided by the blockchain node, the fault message indicating that the second service data does not comprise the part of the plurality of first service data provided by the blockchain node, the fault message comprising the part of the plurality of first service data provided by the blockchain node; and updating, by the one or more processors, the second service data based on the fault message.

9. A non-transitory, computer-readable medium storing one or more instructions executable by a computer system comprising one or more processors to perform operations comprising:

receiving from each of a first plurality of blockchain nodes in a blockchain network a respective first service data, wherein each of the respective first service data is associated with a respective first source address and a respective first destination address;

determining information equivalences in a plurality of first service data received from the first plurality of blockchain nodes;

forming second service data comprising a second source address corresponding to the first plurality of blockchain nodes and a second destination address corresponding to a second plurality of blockchain nodes, wherein the second source address is formed based on the information equivalences determined within the plurality of first service data corresponding to a plurality of first source addresses and a plurality of first destination addresses associated with the plurality of first service data;

sending the second service data to a blockchain node of the first plurality of blockchain nodes with a verification request to verify that the second service data comprises at least a part of the first service data provided by the blockchain node;

receiving a verification message from the blockchain node confirming verification that the second service data comprises at least the part of the first service data provided by the blockchain node; and in response to receiving the verification message from the blockchain node, processing the second service data.

10. The non-transitory, computer-readable medium of claim 9, wherein the instructions further comprise storing the second service data in the blockchain network in response to receiving the verification message from the blockchain node.

11. The non-transitory, computer-readable medium of claim 9, wherein the instructions further comprise:

sending the second service data to a consensus node in the blockchain network, wherein the consensus node verifies digital signatures of the second plurality of blockchain nodes in the second service data, wherein the digital signatures are provided by the first plurality of blockchain nodes as part of the plurality of first service data, wherein the second service data is processed in response to receiving a confirmation from the consensus node confirming the digital signatures in the second service data associate with the second plurality of blockchain nodes.

12. The non-transitory, computer-readable medium of claim 9, wherein the instructions further comprise:

receiving a feedback information from a server, the feedback information comprising a plurality of node identifiers associated with the first plurality of blockchain nodes, wherein the server sends the feedback information in response to receiving requests for service data processing from the first plurality of blockchain nodes.

13. The non-transitory, computer-readable medium of claim 12, wherein the blockchain node is a first blockchain node and the one or more processors are parts of a second blockchain node that is one of the first plurality of blockchain nodes.

14. The non-transitory, computer-readable medium of claim 12, wherein the blockchain node is a first blockchain node and the one or more processors are parts of a second blockchain node that is determined based on a consensus between blockchain nodes in the first plurality of blockchain nodes.

15. The non-transitory, computer-readable medium of claim 12, wherein number of nodes in the first plurality of blockchain nodes is determined by the server and based on a quantity information, the quantity information indicating the number of nodes and being included in at least one request for service data processing received from a respective blockchain node in the plurality of blockchain nodes.

16. The non-transitory, computer-readable medium of claim 9, wherein the operations further comprise:

receiving, by the one or more processors, a fault message indicating that the second service data comprises a part of the plurality of first service data provided by the blockchain node, the fault message indicating that the second service data does not comprise the part of the plurality of first service data provided by the blockchain node, the fault message comprising the part of the plurality of first service data provided by the blockchain node; and updating, by the one or more processors, the second service data based on the fault message.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving from each of a first plurality of blockchain nodes in a blockchain network a respective first service data, wherein each of the respective first service data is associated with a respective first source address and a respective first destination address;

determining information equivalences in a plurality of first service data received from the first plurality of blockchain nodes;

forming second service data comprising a second source address corresponding to the first plurality of blockchain nodes and a second destination address corresponding to a second plurality of blockchain nodes, wherein the second source address is formed based on the information equivalences determined within the plurality of first service data corresponding to a plurality of first source addresses and a plurality of first destination addresses associated with the plurality of first service data;

sending the second service data to a blockchain node of the first plurality of blockchain nodes with a verification request to verify that the second service data comprises at least a part of the first service data provided by the blockchain node;

receiving a verification message from the blockchain node confirming verification that the second service data comprises at least the part of the first service data provided by the blockchain node; and in response to receiving the verification message from the blockchain node, processing the second service data.

18. The computer-implemented system of claim 17, wherein the instructions further comprise storing the second service data in the blockchain network in response to receiving the verification message from the blockchain node.

19. The computer-implemented system of claim 17, wherein the instructions further comprise:
   sending the second service data to a consensus node in the blockchain network, wherein the consensus node verifies digital signatures of the second plurality of blockchain nodes in the second service data, wherein the digital signatures are provided by the first plurality of blockchain nodes as part of the plurality of first service data,
   wherein the second service data is processed in response to receiving a confirmation from the consensus node confirming the digital signatures in the second service data associate with the second plurality of blockchain nodes.

20. The computer-implemented system of claim 17, wherein the instructions further comprise:
   receiving a feedback information from a server, the feedback information comprising a plurality of node identifiers associated with the first plurality of blockchain nodes, wherein the server sends the feedback information in response to receiving requests for service data processing from the first plurality of blockchain nodes.

* * * * *

UNITED STATES PATENT AND TRADEMARK OFFICE
CERTIFICATE OF CORRECTION

PATENT NO. : 11,080,664 B2  
APPLICATION NO. : 16/034252  
DATED : August 3, 2021  
INVENTOR(S) : Hao Wu Page 1 of 2

It is certified that error appears in the above-identified patent and that said Letters Patent is hereby corrected as shown below:

On the Title Page

Page 2/Column 2, Item (56) OTHER PUBLICATIONS/Lines 13-14, Delete "bitcointalk.org/idex.php?topic279249." and insert -- bitcointalk.org/index.php?topic279249. --, therefor.

Page 2/Column 2, Item (56) OTHER PUBLICATIONS/Line 16, Delete "URLhttps://" and insert -- URL:https:// --, therefor.

Page 2/Column 2, Item (56) OTHER PUBLICATIONS/Line 23, Delete "(In Japanese) N." and insert -- (in Japanese). --, therefor.

In the Drawings

On the attached page, Sheet 2 of 9, Reference Numeral 202, FIG. 2, Delete "at lease" and insert -- at least --, therefor.

In the Specification

Column 25/Line 14, Delete "dolor)" and insert -- dollar) --, therefor.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*